Jan. 24, 1928.
H. W. PRICE
1,657,318
PISTON GASKET AND EXPANDING RING THEREFOR
Filed May 13, 1927        2 Sheets-Sheet 1
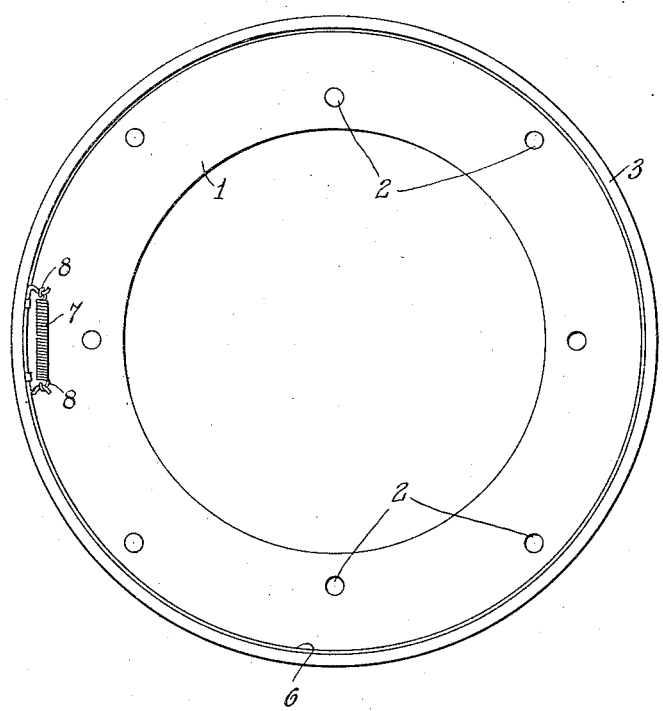
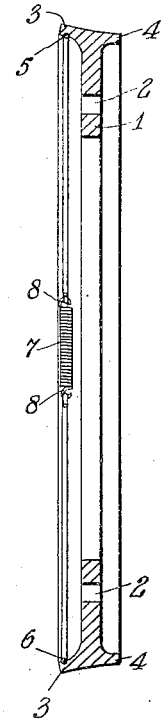
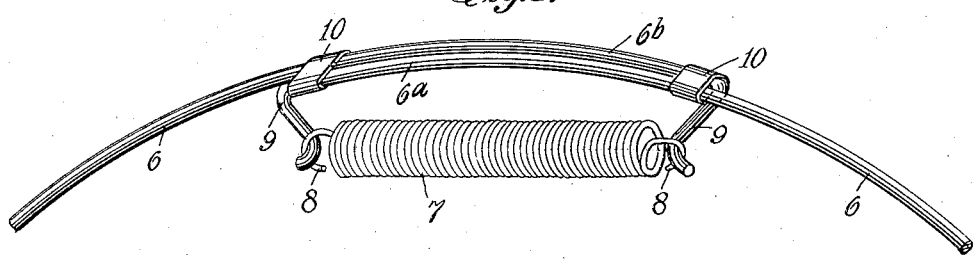
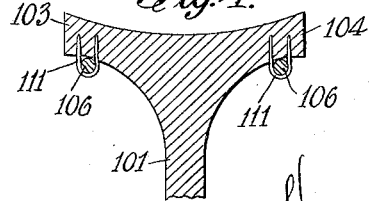
Inventor
Harold W. Price
By his Attorney
Louis Prevost Whitaker Jan. 24, 1928.

H. W. PRICE 1,657,318

PISTON GASKET AND EXPANDING RING THEREFOR

Filed May 13, 1927

Inventor
Harold W. Price
By his Attorney
Louis Trevost Whitaker

Patented Jan. 24, 1928.

1,657,318

UNITED STATES PATENT OFFICE.

HAROLD W. PRICE, OF ELMHURST, NEW YORK, ASSIGNOR TO BRAGG-KLIESRATH CORPORATION, OF LONG ISLAND CITY, NEW YORK, A CORPORATION OF NEW YORK.

PISTON GASKET AND EXPANDING RING THEREFOR.

Application filed May 13, 1927. Serial No. 191,038.

My invention consists in the novel features hereinafter described, reference being had to the accompanying drawings which illustrate two forms in which I have contemplated embodying the invention selected by me for purposes of illustration, and the said invention is fully disclosed in the following description and claims.

In the manufacture of piston gaskets for the pistons of power actuators forming part of vacuum brake mechanisms and other purposes in which an air-tight sealing of the piston with respect to the cylinder wall is necessary, or desirable, the pistons are preferably provided with gaskets or packings of yielding or flexible or elastic material, such as rubber or leather, for example. Rubber packings are unsatisfactory for several reasons, among which may be noted the injurious effect which is produced upon them by mineral oils, or by gasoline, or other hydrocarbon liquids. Leather is also objectionable on account of the difficulty of obtaining a tight joint, especially after a leather gasket has been used for a considerable period. As a result of considerable experiment I have produced a piston gasket formed of compressed cord or cork composition, which is not affected by mineral oils or gasoline, and other hydro-carbons, and is therefore particularly desirable for the purposes mentioned. Cork, however, does not have sufficient elasticity to cause it to seal itself perfectly against the cylinder wall, and it has also been found that a cork gasket will take a set after a certain number of hours and become to a certain extent distorted in form, with the result that a leak develops at some point or points around the cylinder wall between it and the cork gasket.

In carrying out my invention, I form the gasket with an annular flange portion for engaging the cylinder wall, the inner face of the flange being provided with an annular elastic or yielding expanding device constructed to press outwardly against the flange at every point around the same with substantially equal pressure, so as to hold the flange at all times and throughout its entire extent, and with uniform pressure against the cylinder wall to insure an air-tight joint at all times regardless of the longitudinal movements of the piston in the cylinder.

In the accompanying drawings,

Fig. 1 represents a plan view of the gasket embodying one form of my invention.

Fig. 2 represents a sectional view of the same.

Fig. 3 is an enlarged detail view of a portion of the expanding device.

Fig. 4 is an enlarged sectional view of a portion of a piston gasket showing a slight modification.

Figure 5:
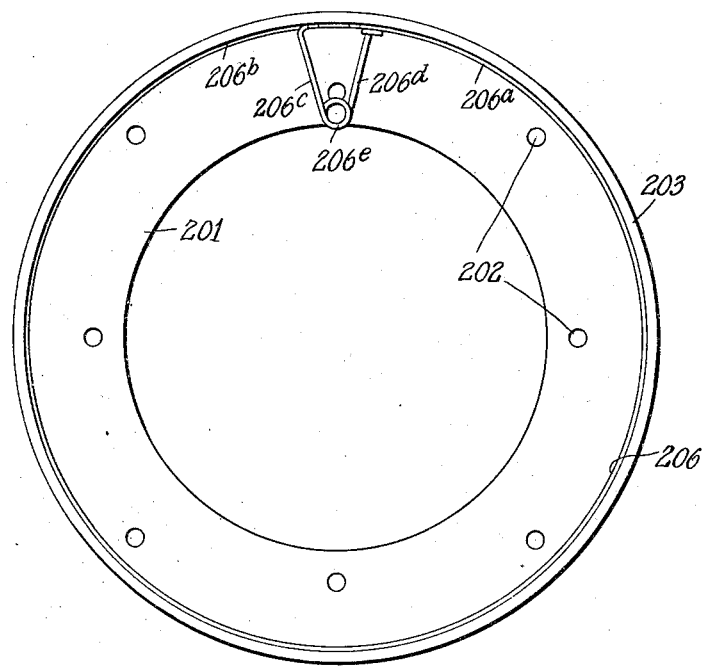
Fig. 5 is a view similar to Fig. 1 showing a modified form of the expanding device.

In the form of my invention illustrated in Figs. 1, 2 and 3, 1 represents the annular attaching portion of the gasket adapted to be clamped between opposing faces of the piston provided in this instance with a plurality of apertures indicated at 2, through which the clamping bolts uniting the clamping portions of the piston may extend to secure the gasket in place in the piston. The annular attaching portion, 1, is provided at its outer edge with an annular flange portion indicated at 3, disposed substantially perpendicularly to the portion, 1, and adapted to engage the cylinder wall to effect an air-tight joint therewith at all times. The gasket may also be provided on the opposite side with an annular flange indicated at 4, if desired, but this is not essential unless the piston is double acting. The flange, 3, is provided on its inner face with an annular groove indicated at 5, in which is located an annular resilient expanding ring indicated at 6, formed preferably by bending a piece of stiff spring wire into ring form with the ends indicated at 6ª and 6ᵇ, overlapping each other, as clearly shown in the drawings, particularly in Fig. 3. Each of the end portions, 6ª, is provided with means for connecting thereto one end of a spring, as the spiral spring, 7, the ends of which are in this instance shown as provided with terminal hooks or loops, 8, engaging hook-shaped arms, 9, projecting inwardly from the respective ends, 6ª and 6ᵇ, of the expanding ring. While it is not absolutely necessary, I prefer to provide the overlapping end portions of the expanding ring with guides, permitting the said end portions, 6ª and 6ᵇ, to move endwise with respect to each other, but holding them in close relation and in substantial parallelism. In this instance I have shown the overlapping portions, 6ª and 6ᵇ, provided with a pair of clips or guides, 10, 10, surrounding the parallel portions of the expanding ring, and these clips may each be secured, if desired, to one of the overlapping parts, permitting the other of said overlapping parts to slide longitudinally therethrough, or the clips may be movable longitudinally with respect to both of the overlapping parts, as may be preferred or found most desirable. The expanding ring is placed in engagement with the annular groove, 5, in the flange, 3, of the gasket, and as will be seen the ring itself exerts an outward pressure upon the flange throughout the full circumference of the ring which is never less than 360° by reason of its resilience, and where the spring, 7, connecting the ends of the overlapping portions so as to press them in a longitudinal direction tending to move the terminal portions, 9, toward each other, the pressure of the spring, 7, is added to the natural resilience of the ring, 6. There is, therefore, no point in the annular flange, 3, which will not be subjected to the outwardly effective expanding force of the expanding ring, and the flange, 3, will be held in air-tight contact with the inner face of the cylinder wall at all times.

By employing the auxiliary spring, 7, the ring, 6, itself may be made of lighter material than would be otherwise necessary, and need not necessarily be made of spring material, as the spring, 7, or its equivalent will force every portion of the ring into engagement with the inner face of the flange of the gasket and hold the gasket flange in air-tight relation with the cylinder wall. I, therefore, wish it to be understood that my invention contemplates the employment of an expanding ring having overlapping end portions longitudinally movable with respect to each other, and subjected to the action of spring or yielding means tending to press the overlapping portions longitudinally in opposite directions whether the spring is provided in the material of the ring itself, or by an auxiliary spring interposed between the ends of the ring, and where the auxiliary spring is employed the ring may or may not be itself composed of spring material, as preferred.

It will be understood that the body of the gasket is preferably formed of cork or cork composition, as for example ground or powdered cork united by a cementitious material and molded under pressure or otherwise, into the desired form, but it is to be understood that the gasket may be formed of rubber, leather or other suitable flexible material, if desired, where such materials may be practically used. The groove, 5, is the means which I prefer to employ for preventing the movement of the expanding ring longitudinally with respect to the flange, 3, but I do not limit myself to the use of an annular groove, as I may use any other means which may accomplish that result, and still permit the expanding ring to engage the flange, 3, of the gasket throughout the entire circumference of the ring. In Figs. 1 and 2, I have shown only one flange of the gasket provided with the expanding ring, but it is to be understood, if desired, both flanges extending on opposite sides of the attaching portion may be so provided.

Thus in Fig. 4 for example, I have shown an enlarged view of a portion of a gasket embodying my invention so provided, in which the corresponding parts to those shown in Figs. 1, 2 and 3, are given the same reference numerals with the addition of 100. In this instance the gasket, 101, is provided with oppositely disposed annular flanges, 103 and 104, each of which is provided with the expanding ring indicated at 106. In this figure instead of having the inner faces of the flanges grooved, I have shown the expanding rings provided with retaining means in this instance in the form of staples, 111, for preventing the movement of the rings longitudinally with respect to the flanges, but it will be understood that other forms of retaining means may be employed. For example, the flanges may be provided with grooves to receive the expanding ring, as in Figs. 1 and 2, if preferred.

Figure 6:
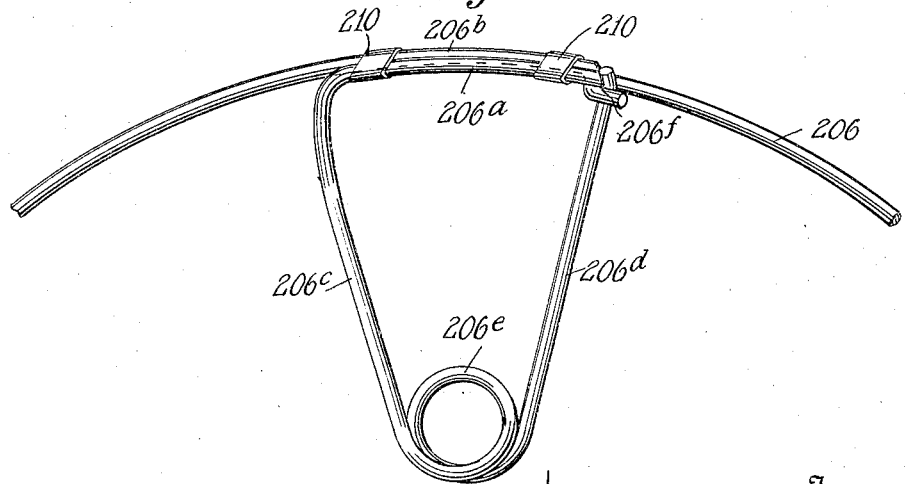
Fig. 6 is an enlarged detail view similar to Fig. 3 showing the form of expanding device illustrated in Fig. 5.

In Figs. 5 and 6, I have shown another modification of my invention in which the parts corresponding to those in Fig. 1 are given the same reference numerals with the addition of 200. In these figures the gasket, 201, has an annular flange, 203, provided with an expanding ring, 206, which engages an annular groove in the same manner as indicated in Figs. 1 and 2, and is formed in this instance preferably of resilient wire or rod having the overlapping portions, 206ª and 206ᵇ. In this instance an auxiliary spring is formed by bending a terminal portion of the wire forming the ring inward toward the axis of the ring, as indicated at 206ᶜ, and outward as indicated at 206ᵈ, and one or more coils at 206ᵉ, may be formed between the portions, 206ᶜ and 206ᵈ, as shown. The other terminal portion of the ring is provided with a shoulder indicated at 206ᶠ, to engage the spring arm, 206ᵈ, and the overlapping portions, 206ª and 206ᵇ, may also be provided with suitable guiding devices indicated at 210, for example, clips such as previously described with reference to Figs. 1, 2 and 3, through which the overlapping portions of the ring, 206, may move longitudinally with respect to each other, the said guiding devices being secured to one of the overlapping parts and movable with respect to the other, or movable with respect to both, as may be preferred. The operation of this expanding ring will be exactly the same as that previously described with reference to Figs. 1, 2 and 3, and in this instance the auxiliary spring member provided by the arms, 206ᶜ and 206ᵈ, and the coil or coils, 206ᵉ, will act to expand the ring by pressing the overlapping parts in opposite directions away from each other, thereby acting in addition to the resilience of the ring itself in pressing every portion of the flange, 203, outwardly into air-tight contact with the cylinder wall. It will be understood that where desired the gasket may be provided with two flanges, as indicated in Fig. 4, each of which is provided with an expanding ring such as is shown in Figs. 5 and 6.

It will be seen that by reason of the overlapping end portions which are of the full size of the material of the ring, the expanding ring actually has peripheral portions, or in other words a peripheral or circumferential length greater than 360°, which insures the application of outward pressure at every point in the entire circumference of 360° of the gasket flange. It will also be seen that the spring expanding ring is so located and occupies such a small amount of space that no part of it can project beyond the gasket flange, and there is no danger of it being injured when the piston arrives at the end of the cylinder, at which point the piston is ordinarily arrested by suitable means to prevent injury to the gasket itself, hence the expanding ring will likewise be protected. The inwardly extending arms which are attached to or formed as a part of the ring are also prevented from changing their position which is approximately parallel to the central attaching portion of the gasket, so that no part of the construction can project outwardly from the piston.

What I claim and desire to secure by Letters Patent is:—

1. A circular expander for piston gaskets provided with overlapping end portions capable of longitudinal movement with respect to each other, and a spring member connecting the terminal portions of said overlapping end portions, and tending to shift said overlapping portions longitudinally with respect to each other in a direction to expand the ring.

2. A circular expander for piston gaskets provided with overlapping end portions capable of longitudinal movement with respect to each other, and a spring member connecting the terminal portions of said overlapping end portions, and tending to shift said overlapping portions longitudinally with respect to each other in a direction to expand the ring, said overlapping portions being provided with guiding devices for holding them in parallelism, while permitting the longitudinal movement of said overlapping portions with respect to each other under the action of said spring member.

3. A circular expander for piston gaskets comprising a ring formed of spring wire having overlapping end portions of full size material movable longitudinally with respect to each other, whereby said ring will exert an outward pressure on the gasket flange uniformly throughout the entire circumferential length of the ring, which is greater than 360°, said overlapping portions being provided with guiding devices for holding them in parallelism, while permitting free longitudinal movement of said overlapping portions with respect to each other.

4. A circular expander for piston gaskets comprising a ring formed of spring wire having overlapping end portions movable longitudinally with respect to each other, whereby said ring will exert an outward pressure on the gasket flange uniformly throughout the entire circumferential length of said ring, which is greater than 360°, said overlapping portions of the ring being connected by an auxiliary spring member acting to effect the longitudinal movement of said overlapping members with respect to each other in a direction to expand the ring, whereby the tension of said auxiliary spring member is added to the natural resilience of the ring itself.

5. A circular expander for piston gaskets comprising a ring formed of spring wire having overlapping end portions movable longitudinally with respect to each other, whereby said ring will exert an outward pressure on the gasket flange substantially uniformly throughout the entire circumferential length of said ring, which is greater than 360°, said ring being provided with an integral spring member formed in one piece with one of said overlapping portions and engaging a part connected with the other of said overlapping portions, and tending to shift said overlapping portions longitudinally with respect to each other in a direction to expand the ring.

6. A circular expander for piston gaskets comprising a ring formed of spring wire having overlapping portions movable longitudinally with respect to each other, whereby said ring will exert an outward pressure on the gasket flange substantially uniformly throughout the entire circumferential length of said ring, which is greater than 360°, said ring being provided with an integral spring member formed in one piece with one of said overlapping portions and engaging a part connected with the other of said overlapping portions, and tending to shift said overlapping portions longitudinally with respect to each other in a direction to expand the ring, and guiding devices engaging the overlapping portions of the ring for holding them in parallelism.

7. The combination with a piston gasket having an annular flexible flange of a circular expander, formed of spring wire engaging the inner face of said flange throughout the entire circumferential length of said ring, and provided with overlapping end portions movable longitudinally with respect to each other, and yielding means for holding said ring against longitudinal movement with respect to said flange.

8. The combination with a piston gasket having an annular flexible flange, of a circular expander engaging the inner face of said flange throughout the entire circumferential length of the ring, and provided with overlapping end portions movable longitudinally with respect to said flange, the overlapping portions of said ring having inwardly projecting terminal portions, and a spring member connecting said terminal portions.

9. The combination with a piston gasket having an annular flexible flange, of a circular expander engaging the inner face of said flange throughout the entire circumferential length of the ring, and provided with overlapping end portions movable longitudinally with respect to each other, and yielding means for holding said ring against longitudinal movement with respect to said flange, the overlapping end portions of said ring having inwardly projecting terminal portions, and a spring member connecting said terminal portions, and guiding devices for holding the overlapping end portions of the ring in parallelism, while permitting their longitudinal relative movement.

10. The combination with a piston gasket formed mainly of cork and provided with an attaching portion and an annular flange portion, provided on its inner surface with an annular ring retaining groove, of a circular spring expander engaging said groove and provided with overlapping end portions, a spring member connecting the terminal portions of said overlapping end portion and exerting a longitudinal pressure thereon tending to expand the ring, whereby said ring will exert a substantially uniform outward pressure on the flange portion of the gasket throughout the entire circumferential length, of more than 360°, of said ring.

11. The combination with a piston gasket provided with an annular flexible flange, of a circular spring expander formed of wire bent into ring form, and having overlapping end portions, said end portions being provided with arms projecting toward the interior of the ring and located substantially in the plane of the ring, and being united by a spring connection located substantially in the plane of the ring and acting in a direction to expand the ring, whereby said arms are held in position in the plane of the ring, by the ring itself, and no part of said expander will project beyond the edge of the gasket.

In testimony whereof I affix my signature.

HAROLD W. PRICE.